United States Patent [19]

Lunardon et al.

[11] Patent Number: 4,769,435

[45] Date of Patent: Sep. 6, 1988

[54] PROCESS FOR THE MANUFACTURE OF THERMOPLASTIC POLYURETHANES

[75] Inventors: Gianflavio Lunardon, Padua; Lino Credali, Casalecchio di Reno; Ermanno Benetti, Mirano; Carlo Mulas, Mestre, all of Italy

[73] Assignee: Ausimont S.p.A., Milan, Italy

[21] Appl. No.: 74,353

[22] Filed: Jul. 16, 1987

[51] Int. Cl.[4] .............................................. C08G 18/30
[52] U.S. Cl. ..................................... 528/28; 528/60; 528/61; 528/65; 528/66; 528/75; 528/76; 528/77; 528/78; 528/80; 528/81; 528/83
[58] Field of Search ....................... 528/28, 60, 61, 65, 528/66, 75, 76, 77, 78, 80, 81, 83

[56] References Cited

U.S. PATENT DOCUMENTS 4,532,316 7/1985 Henn ...................................... 528/59

OTHER PUBLICATIONS

DE-A-2549372, Continuous Polyurethane Elastomer Prepn. by Vioorous Kneading in Double Screw Extruder to Give Homogeneous Prod.
EP-A-0021323, (Corresponds to U.S. Pat. No. 4,286,080), Continuous Polyurethane-Urea Prepn. in Multiroller Extruder by Reacting Poly:ol, Poly:isocyanate and Water Present as Gas Phase.
DE-A-1964834, Polyurethane Elastomers Mfr by Direct Reaction in Extruder.
DE-A-2447368, Thermoplastic Polyurethane Elastomers Prepn. by Introducing Components into Extruder Inlet Zone, and Maintaining Definite Temp. Profile in Extruder.

Primary Examiner—Maurice J. Welsh
Attorney, Agent, or Firm—Stevens, Davis, Miller & Mosher

[57] ABSTRACT

The invention concerns a process for the manufacture of thermoplastic polyurethanes wherein an organic polyisocyanate is made to polymerize with a polyol (reactive with same isocyanate) in the presence of a chain extending agent having a molecular weight lower than 400, under continuous stirring, at a temperature higher than 150° C. and for a time sufficient to obtain a product having a melt flow index lower than 25 g/10'.

13 Claims, No Drawings

PROCESS FOR THE MANUFACTURE OF THERMOPLASTIC POLYURETHANES

FIELD OF THE INVENTION

The invention concerns a process for the manufacture of thermoplastic polyurethans showing excellent physical features comparable to the ones of a technopolymer.

BACKGROUND OF THE INVENTION

Polyurethans are obtained by reacting long chain polyols, having a molecular weight from 400 to 10,000, with organic polyisocyanates, preferably diisocyanates, in the presence of chain extending agents generally consisting of glycols, polyols or amines having short chain and molecular weight lower than 400. Polyurethans are exploited for the manufacture of a wide variety of materials; in particular, elastomeric thermoplastic polyurethans can be processed by injection molding extrusion, calendering etc., to produce shaped articles useful in the field of industry. The use of such products to prepare materials showing a structural resistance equal to the one of the products known as "technopolymers" (for instance nylon) is however limited by the necessity of using reinforcing materials, such as glass or carbon fibres, in order to obtain the desired rigidity, impact resistance and so on.

The features of polyurethans, in particular hardness, can be changed within a wide range of values comprised between those of the very soft materials and those of hard materials having a limited flexibility, by changing the amount of the various components used for their preparation: polyols, polyisocyanates and chain extending agents.

In particular, this change of features can be reached by changing, the —NCO group being the same, the weight ratio between the long chain polyol and the short chain polyol. In fact, the units of the polymeric chain derived from the low molecular weight extending agent and from the polyisocyanate give rise to hard segments having a high elastic modulus, whereas the chain units deriving from the high molecular weight polyol give rise to soft segments, having a low elastic modulus, due to the presence of the long chain of the polyol. In the case of an essentially linear polyurethan (prepared from a diisocyanate, a difunctional polyol and a difunctional extending agent), an increase of the percentage of the extending agent (in comparison with the polyol) is likely to embody into the chain a higher percentage of hard segments and this makes the polyurethans more and more hard, but more brittle; namely the material, although thermoplastic, loses its elastomeric properties. The no more elastomeric material shows, due to the high percentage of hard segments, a hardness higher than 70 Shore D and a high flexural modulus.

It is known from U.S. Pat. No. 3,356,650 to prepare a thermoplastic polyurethan showing a hardness higher than 70 Shore D, using high ratios between hard and flexible segments. According to the process described in such patent, thermoplastic polyurethans are prepared by reacting the organic polyisocyanate with a mixture of reagents consisting of at least one compound containing three active hydrogen atoms and other organic compounds containing two active hydrogen atoms, determined according to the Zerewitinoff method, said active hydrogen atoms being reactive with the isocyanate group. The main characteristics of the process described in said U.S. patent are as follows:

(1) The reactants mixture must have an average molecular weight lower than 500, whereas each single component of the mixture can have a higher molecular weight, up to 5,000 or higher;

(2) the mixture must contain an amount of components having a functionality (for each molecule) higher than 2, in such a manner that from 0,01 to 20% of the groups containing the active hydrogen atoms are supplied by the compounds containing more than 2 functional groups per molecule; some of the properties, such as thermoplasticity, is negatively affected by the values out of these limits;

(3) the reactants are used in such an amount as to keep the equivalent NCO/OH ratio between 0.7 and 1.3.

The conditions above are crytical to produce hard polyurethans having high heat distorsion temperature and high hardness (even higher than 80 Shore D). However, when particular polyisocyanates and/or diols and/or particular process conditions are used, the polyurethans can be brittle and therefore not suitable for application in those fields where engineering type services are requested.

The Applicant has now succeeded in overcoming these drawbacks and therefore in producing polyurethans characterized by high impact-resistance, high flexural modulus and high heat distortion temperature, by carrying out the reaction between the organic polyisocyanate, the long chain polyol and the chain extending agent under particular process conditions.

DISCLOSURE OF THE INVENTION

In its broadest aspect our process is characterized in that the physical properties of polyurethans, and in particular the impact resistance, are improved by carrying out the polymerization of an organic polyisocyanate with a polyol reactive with same isocyanate said polyol having an average functionality of at least 2 and a molecular weight higher than 400), in the presence of a chain extending agent having a molecular weight lower than 400, under continuous stirring, at a temperature higher than 150° C., at least in the final step of the process, and for a time sufficient to obtain a product having a melt flow index MFI lower than 25 g/10' (at 200° C. and under a 2.16 kg load; determined according to ASTM D1238/74).

Values of the melt flow index (MFI) also equal to 0 g/10', at 200° C., are suitable to obtain polyurethans showing improved physical characteristics.

The reaction temperature, according to the present invention, is at least equal to 150° C., preferably from 200° C. to 250° C., either to increase the reaction rate or to assure a low viscosity of the reacting mixture so that it can be stirred as long as possible and then transferred, as soon as the desired MFI value is reached, to the following process steps for the preparation and curing of the product. By a proper selection of the temperature of the reaction time (under stirring), and of the other operative conditions (depending on the type of raw materials and/or on the composition of the reaction mass), it is possible to reach a molecular weight bestowing on the final product an excellent quality degree. It is possible to verify that the final reaction point (and therefore the desired quality of the product) is reached, by recording the viscosity of the molten product.

The materials obtained according to the invention show MFI values corresponding to viscosity levels much higher than the ones of the materials obtained according to the known techniques and therefore remarkably higher physical features.

In fact, we noted the existence of a correlation between the mechanical properties, such as resilience of polyurethans and their viscosity in the molten state, verified by MFI measurements; it was further observed that the higher values of the viscosity of the polymer in the molten state and, consequently its improved mechanical properties come from better technological synthesis conditions.

According to the used formulations, it is possible to fix a value of said MFI, above which higher physical properties are obtained, such as a flexural modulus at 23° C. of at least 1,000 MPa, a Izod (notched) resilience at 23° C. of at least 150J/m and a heat distortion temperature, at 1.82 MPa, of at least 50° C. Such best physical features are the proof of the surprising results which can be obtained by applying the operative technological conditions above.

According to the reactivity of the used materials, it is possible to select the so-called "one-shot" technique or, alternatively, the "pre-polymer" technique. According to the one-shot technique, the diisocyanate, the polyol and the chain extending agent are brought into contact in one single operation, optionally by pre-mixing the chain extending agent; the prepolymerization technique, on the contrary, is providing first the preparation of a prepolymer between the polyisocyanate and the high molecular polyol and, then, the reaction between the thus formed prepolymer and the low molecular weight polyol (chain extending agent). It is preferable, when possible, to exploit the "prepolymer" technique in the synthesis of the termoplastic polyurethan because:

(1) it allows the handling of materials which are generally less sensitive, as to chemical and physical stability;

(2) it allows the formation of more regular polymeric chains (more homogeneous as to the size and to the statistical distribution of the hard/soft segments);

(3) it makes it easier to reach higher conversions and molecular weight, especially when one has to deal with polyhydric intermediates reactive with isocyanates which are different among them as to structure, molecular weight and reactivity.

Another advantage of the prepolymer technique is that it allows, when particularly reactive materials are used, to use a higher "pot-life" of the reaction mixture at high temperature and therefore to make possible, in practice, synthesis conditions which otherwise cannot be used, advantageous for the final properties of the product.

The process according to the invention can be performed using an apparatus suitable for this purpose, such as, for instance, reaction vessels of the "batch" type, connected to a curing mold, to a heated conveyor belt or to an extruder-reactor. It is thus possible to work according to a continuous process in an extruder-reactor, which directly supplies the product pellets.

Said extruder-reactor is such as to assure the temperature conditions, the shear stress (in the mixing) and the residence time required by the process. Such extruders may be provided with one or two screws, or provided with screws or other devices suitable for mixing and extrusion, which move in a reciprocating way along their axes; in particular, twin-screw extruders are preferred, having co-rotating and self-cleaning (endowed with a high percentage of homogenizing elements).

These extruders are generally coupled with a usual casting machine; an example of twin-screw extruders are the fast assemblable extruders of the Werner-Pfleiderer ZSK 53 type of the Werner firm, or of the Maris 55V type of the Maris firm and so on. By this was it is possible to obtain polymers having high molecular weights, generally higher than 30,000, which allow the material to reach high physical characteristics.

For the preparation of a thermoplastic polyurethan, according to the invention, a catalyst can be used, although it is not absolutely necessary; one can use all the catalysts, known in the art, which catalyze the reaction between the isocyanic group and the compounds containing reactive hydrogen atoms. A detailed list of catalysts is recorded, for instance, in U.S. Pat. Nos. 2,620,516; 2,621,166 and 2,729,618, cited as a reference. Also the raw materials to be used for the preparation of a thermoplastic polyurethan are already known; see for instance U.S. Pat. No. 3,356,650.

As to the organic poly-isocyanates, we may cite, as an example, methylen-diphenyl-diisocyanate (2,4' and 4,4' isomers and mixtures thereof), m- and p-phenylen-diisocyanates, chlorophenyl-diisocyanates, alpha, alpha'-xylene-diisocyanate, 2,4- and 2,6-toluene-diisocyanate (and mixtures thereof), toluidin-diisocyanate, hexamethylene-diisocyanate, 1,5-naphthalene-diisocyanate, isophoron-diisocyanate, methylene-bis (cyclohexyl-isocyanate), its 4,4' and 2,4' isomers and the mixtures thereof. Preferred diisocyanates are 2,4 and 2,6-toluendiisocyanate, in the 80/20 ratio, and the 4,4'-methylen-diisocyanate.

As to the high molecular weight polyols we report as an example: polyol-polyethers, polyols-polyesters, polyethers with amine termination, polycarbonates ending with hydroxy groups, polybutadienes ending with hydroxy groups, polybutadiene-acrylonitrile copolymers with hydroxy termination, polybutadiene-acrylonitrile copolymers with amine termination, copolymers of dialkyl-siloxanes and alkylene oxides (hydroxy ended) and so on.

An example of polyol-polyethers are: polyoxyethylene glycols, polyoxypropylene glycols, optionally capped with ethylene oxide, block or random copolymers of ethylene-and propylene-oxide, propoxylated tri- and tetrahydroxy alcohols, such as glycerine, trimethylolpropane, pentaerythritol and the like, optionally capped with ethylene oxide, polytetramethylene glycol, block or random copolymers of tetrahydrofurane and of ethylene oxide and/or propylene oxide, and the products derived from the reaction of the above mentioned polyol-polyethers with acids and/or esters of polyfunctional polycarboxylic acids. Illustrative examples of polyol-polyesters are those prepared by polymerizing epsylon-caprolacton, using as an initiator ethylene glycol, ethanolamine and the like, and those prepared by esterifying polycarboxylic acids, such as phtalic acid, terephtalic acid, succinic acid, glutaric acid, adipic acid, azelaic acid and the like, with polyhydroxy alcohols, such as ethylene glycol, butanediol, glycerine, trimethylpropane, 1,2,6-hexanetriol, cyclohexanedimethanol and like.

An example of polyethers having aminic endings are di- and tri-prymary aliphatic amines, structurally derived from glycols or polyoxypropylene triols, which are known on the market under the trade name JEFFAMINE and manufactured by the Jefferson Chemical Company—U.S.A.

An example of polycarbonates containing hydroxy groups are those prepared by the reaction of diols, such as propane-1,3-diol, butane-1,4-diol, hexane-1,6-diol, diethylene glycol, triethylene glycol, dipropylene glycol and the like, with diaryl-carbonates, such as diphenyl-carbonate, or phosgene.

An example of polyethers containing silicium are the copolymers of alkylene oxides with dialkylsiloxanes and an example of hydroxy ended poly-butadiene copolymers are compounds which are retrievable under the trade name "Poly BD Liquid Resins", traded by the Arco Chemical Co.

An example of butadiene/acrylonitrile copolymers, having hydroxy and amino termination, are the materials available under the trade name "HYCAR" with hydroxy ending (HT) or with amino termination (AT). Preferred polyols are the difunctional or trifunctional polyol-polyethers, and mixtures thereof, having a molecular weight comprised between 500 and 10,000 and preferably between 1,000 and 6,000.

The chain extending agents are consisting of linear or branched chain aliphatic diols, and also cycloaliphatic diols, preferably containing from 2 to 8 carbon atoms and having a molecular weight lower than 400.

An example of said diols are: ethylene glycol, 1,3-propanediol, 1,4-butanediol, 1,5-pentanediol, 1,6-hexanediol, 1,2-propanediol, 1,3-butanediol, 2,3-butanediol, 1-3-pentanediol, 1,2-hexanediol, 3-methylpentane-1,5-diol, 1,4-cyclohexane-dimethanol and the like and mixtures thereof.

Diethylenglycol, dipropyleneglycol, tripropyleneglycol, ethanolamine, N-methyl-diethanol-amine, N-ethyl-diethanolamine and the like can be also used as diol chain extending agents; diol esters obtained by esterifying the above mentioned diols with acids, such as adipic acid, azelaic acid, glutaric acid and the like or the adducts with ε-caprolacton cal also be used. Preferred compounds are: 1,4-butanediol, ethylene glycol, diethylene-glycol and 1,4-cyclohexane-dimethanol; all these compounds can be used either alone or as a mixture.

The mixture of the organic compounds (polyols+-chain extending agent) containing the hydrogen reactive with isocyanate (according to the Zerewitinoff method) has an average molecular weight lower than 500 and preferably than 300. The NCO/OH ratio is from 0.7 to 1.3 and preferably from 0.9 to 1.1.

By the process of the present invention polyurethans having high modulus, high resilience and heat distortion temperature can be obtained both in expanded and nonexpanded form; this last form can be obtained by applying methods well known in the art. A swelling agent, for instance, can be incorporated into the reaction mixture when polyurethans are prepared. Preferably, it may consists of a volatile organic liquid, which evaporates during the exothermal reaction which takes place during the formation of polyurethane.

These liquids must be inert towards the reactants which take part to the reaction, must not interfere in any way with the reaction course, and should have a boiling point from 20° C. to about 110° C. An example are: butane, hexane, heptane, methylene chloride, chloroform, monofluorotrichloromethane, chlorodifluoromethane, dichlorodifluoromethane and the like. Finally, the cellular form can be obtained during the extrusion molding of the corresponding flakes or "pellets" etc., of thermoplastic polyurethan, using an inert blowing gas during the operation, such as nitrogen, air, $CO_2$ and so on.

The following examples are reported to better define the present invention and are not in any case limitative.

EXAMPLE 1

(Comparison Example)

Into a 400 $cm^3$ reaction vessel, insulated and provided with stirrer, there were introduced 23.0 g of polyoxypropyleneglycol (M.W. 2,000), 21.7 g of a trifunctional polyol (M.W. 3,000) obtained by reacting glycerine and propylene oxide and 65.3 g of dipropyleneglycol. The polyols mixture was deareated and dehydrated under vacuum and slight agitation for one hour at 60° C. Thereafter, when the temperature was lowered down to 50° C., we added 90.0 g of a mixture consisting of 2,4 and 2,6-toluenediisocyanate in a 80/20 ratio, kept at room temperature; the reaction vessel was then stirred under vacuum.

The temperature was raised up to 90° C. within 10 minutes and kept at this level by means of an electric resistance (applied out of the reaction vessel), for further 20 minutes; the reaction product was then poured into a frame mold, placed into a laboratory press kept at 135° C. and finally compressed and quickly cooled down to room temperature. By this way a transparent polyurethan plate was obtained of 135×135×3.2 mm size, which after testing as to the physical properties gave the results recorded on Table 1.

EXAMPLE 2

(Comparative)

Example 1 was repeated and the reaction product was poured into the frame mold and transferred in a laboratory press kept at 135° C. The material was maintained in the mold at this temperature for 75 minutes and then was cooled down to room temperature; the thus obtained product was transparent and gave the results recorded on table 1.

EXAMPLE 3

(Comparative)

Example 2 was repeated up to staying of the polyurethan in the mold for 75 minutes at 135° C.

Thereafter, a post-curing was carried out for 22 hours at 75° C. and for 2 hours at 130° C.

The obtained material was transparent and had the properties reported in the table.

EXAMPLE 4

Example 1 was repeated under the following working conditions. The mixture of polyols was dehydrated for 1 hour at 60° C. and the temperature was then raised up to 80° C., whereafter we added the isocyanate, kept at room temperature. Under continuous stirring (in a time of 9 minutes) the temperature spontaneously raised up to 121° C. and then (supplying heat in a time of 8 minutes) up to 200° C.; this temperature was maintained in the reaction vessel for further 8 minutes. The polymer was transferred into a frame mold and placed into a press at the temperature of 200° C. for 10 minutes. After having discontinued the heating, the material was allowed to reach the room temperature within about 2 hours; the thus obtained product was dull and showed the properties recorded on table 1.

EXAMPLE 5

Using the same apparatus of example 1, we introduced:
23.0 g of the polyoxypropyleneglycol of example 1;
21.7 g of the trifunctional polyol of example 1;
50.4 g of the dipropylene-glycol of example 1;
10 g of 1,4-butanediol.
Under stirring and under vacuum the mixture was dehydrated and deaerated for 1 hour at 60° C. The polyol mixture, kept at 60° C., was additioned with 90 g of the diisocyanate mixture of example 1 and the released heat let the temperature raise up to 115° C. Thereafter, other heat was supplied and the temperature rose up to 205° C. within 10 minutes; this temperature was kept steadily for further 2 minutes. At the end the material was transferred into a frame mold and placed into a laboratory press at the temperature of 200° C. for 10 minutes; the material was allowed to cool to room temperature within 2 hours. The resulting plate was dull and, when tested, gave the results recorded on table 1.

EXAMPLE 6

Into the same reaction vessel of example 1 we loaded the following polyols:
23.0 g of the polyoxypropylene glycol of example 1 and
21.8 g of the trifunctional polyol of example 1.
Under stirring and under vacuum the materials were dehydrated for 1 hour at 80° C. The thus obtained mixture was additioned with 90.0 g of the diisocyanate mixture of example 1 and the reaction between polyols and the isocyanate was carried out under vacuum, while stirring for 1 hour at 80° C. The pre-polymer was additioned with 44.0 g of 1,4-butanediol and the mixture was strongly stirred under vacuum for 60 seconds, whereafter the material was transferred into a frame mold and placed into a laboratory press at the temperature of 200° C. for 20 minutes. The thus obtained polymer was then allowed to cure for 22 hours at 75° C. and for 2 hours at 150° C.

EXAMPLE 7

Into a fast twin-screw extruder of the Werner ZS53 type (36 diameter) with such a screw profile that the homogenizing zone was brought up to 55% of the total length of the extruder, were loaded from a casting machine:
100 parts of pre-polymer obtained from 13.1 parts of a trifunctional polyol having molecular weight 6,000 (obtained in turn from glycerine and propylene oxide and capped with ethylene oxide) and from 86.9 parts of 4,4'-methylene-bis (phenylisocyanate), said pre-polymer being kept at 80° C.;
29.8 parts of butanediol containing 0.013 g of butyl-tin-di-laurate.

The temperature profile along the extruder was allowed to swing between 200° and 220° C.; the screw was rotating at 150 rpm and the residence time of the reactants was 90 seconds. The strings at the outlet of the extruder were cooled and pelletized; the obtained material was dull and showed the properties reported in the table.

TABLE 1

| PROPERTIES | | EXAMPLE | | | | | | |
|---|---|---|---|---|---|---|---|---|
| | | 1 | 2 | 3 | 4 | 5 | 6 | 7 |
| Young's modulus at 23° C. | ASTM D790 (MPa) | 1430 | 1450 | 1510 | 1470 | 1615 | 1500 | 1920 |
| IZOD (notch) resilience at 23° C. | ASTM D256-56 (J/m) | <10 | 20 | 30 | 200 | 590 | 750 | 800 |
| Heat deformation temperature (HDT) at 1.82 MPa | ASTM D748 (°C.) | 43 | 46 | 50 | 57 | 70 | 71 | 91 |
| Hardness at 23° C. | ASTM D2240 (Shore D) | 78 | 78 | 79 | 76 | 78 | 75 | 80 |
| Melt Flow Index (MFI) at 200° C. and 2.16 kg | ASTM D1238 g/10' 74 (1) | (2) | >50 | 30 | 5.9 | 20 | 0 | 0 |

(1) heating time: 5' (after charging the load, flow for 1' and sampling for 1 minute).
(2) flows at 100° C. without load.

What we claim is:

1. A process for the manufacture of thermoplastic polyurethanes showing improved physical properties, by reacting an organic polyisocyanate with a polyol reactive with said polyisocyanate having an average functionality at least equal to 2 and a molecular weight higher than 400, in the presence of a chain extending agent having a molecular weight lower than 400, characterized in that the reaction is carried out under continuous stirring, at a temperature higher than 150° C., at least in the final step of the process, and for a time sufficient to obtain a product having a melt flow index (MFI) lower than 25 g/10' (at 200° C. and 2.16 kg), wherein the reaction temperature is from 200° to about 250° C., and wherein the mixture of the organic compounds (polyols+chain extending agent) containing hydrogen reactive with the isocyanate, according to the Zerewitinoff method, has a molecular weight lower than 500.

2. A process according to claim 1, wherein said melt flow index of the polyurethan is from 0 to 25 g/10'.

3. A process according to claim 1 or 2, wherein the reaction temperature is from 200° C. to about 250° C.

4. A process according to any of the preceding claims, characterized in being performed according to the pre-polymer technique.

5. A process according to any of the preceding claims, characterized in being performed in a continuous way.

6. A process according to claim 5, characterized in being performed continuously in an extruder.

7. A process according to any of the preceding claims, wherein the organic polyisocyanate is 2,4- and 2,6-toluen-diisocyanate in a 80/20 ratio or 4,4'-methylen-diphenyl-diisocyanate.

8. A process according to any of the preceding claims, wherein the polyol reactive with the polyisocyanate is a difunctional or trifunctional polyol-polyether or a mixture thereof, having a molecular weight from 500 to 10,000.

9. A process according to any of the preceding claims, wherein the chain extending agent is a linear or branched aliphatic diol or a cycloaliphatic diol, containing from 2 to 8 C atoms.

10. A process according to any of the preceding claims, wherein the mixture of the organic compounds (polyols+chain extending agent) containing hydrogen reactive with the isocyanate, according to the Zerewitinoff method, has a molecular weight lower than 500 and preferably than 300.

11. A process according to any of the precending claims, wherein the NCO/OH ratio is from 0.7 to 1.3.

12. A process according to any one of the preceding claims, wherein the polyol reactive with the polyisocyanate is a difunctional or trifunctional polyol-polyether or a mixture thereof, having a molecular weight from 1,000 to 6,000.

13. A process according to any one of the preceding claims, wherein the NCO/OH ratio is from 0.9 to 1.1.

* * * * *

REEXAMINATION CERTIFICATE (1251st)

United States Patent [19]
Lunardon et al.

[11] B1 4,769,435
[45] Certificate Issued  Apr. 10, 1990

[54] PROCESS FOR THE MANUFACTURE OF THERMOPLASTIC POLYURETHANES

[75] Inventors: Gianflavio Lunardon, Padua; Lino Credali, Casalecchio di Reno; Ermanno Benetti, Mirano; Carlo Mulas, Mestre, all of Italy

[73] Assignee: Ausimont S.p.A., Milan, Italy

Reexamination Request:
No. 90/001,715, Feb. 13, 1989

Reexamination Certificate for:
Patent No.: 4,769,435
Issued: Sep. 6, 1988
Appl. No.: 74,353
Filed: Jul. 16, 1987

[30] Foreign Application Priority Data
Jul. 21, 1986 [IT] Italy ............... 21193 A/86

[51] Int. Cl.$^4$ ............................................. C08G 18/30
[52] U.S. Cl. ................................ 528/28; 528/61; 528/65; 528/66; 528/75; 528/76; 528/77; 528/78; 528/80; 528/81; 528/83
[58] Field of Search ............ 528/28, 60, 61, 65, 528/66, 75, 76, 77, 78, 80, 81, 83

[56] References Cited
U.S. PATENT DOCUMENTS

| | | | |
|---|---|---|---|
| 3,642,964 | 2/1972 | Rausch et al. | 264/40 |
| 3,963,679 | 6/1976 | Ullrich et al. | 260/75 NE |
| 4,376,834 | 3/1983 | Goldwasser et al. | 521/159 |
| 4,567,236 | 1/1986 | Goldwasser et al. | 525/127 |

*Primary Examiner*—Maurice J. Welsh

[57] ABSTRACT

The invention concerns a process for the manufacture of thermoplastic polyurethanes wherein an organic polyisocyanate is made to polymerize with a polyol (reactive with same isocyanate) in the presence of a chain extending agent having a molecular weight lower than 400, under continuous stirring, at a temperature higher than 150° C. and for a time sufficient to obtain a product having a melt flow index lower than 25 g/10′.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 6 is cancelled.

Claims 1 and 7 are determined to be patentable as amended.

Claims 2–5 and 8–13, dependent on an amended claim, are determined to be patentable.

1. A process for the manufacture of thermoplastic polyurethanes showing improved physical properties, by reacting [an organic polyisocyanate] *toluene diisocyanate* with a polyol reactive with said [polyisocyanate] *toluene diisocyanate* having an average functionality at least equal to 2 and a molecular weight higher than 400 in the presence of a chain extending agent having a molecular weight lower than 400, characterized in that the reaction is carried out under continuous stirring, at a temperature higher than 150° C., [at least in the final step of the process] *before the shaping and curing of the product*, and for a time sufficient to obtain a product having a melt flow index (MFI) lower than 25 g/10' (at 200° C. and 2.16 kg), wherein the reaction temperature is from 200° to about 250° C., and wherein the mixture of the organic compounds (polyols+chain extending agent) containing hydrogen reactive with the isocyanate, according to the Zerewitinoff method, has a molecular weight lower than 500.

7. A process according to any of the preceding claims, wherein the [organic polyisocyanate] *toluene diisocyanate* is 2,4- and 2,6-toluen-diisocyanate in a 80/20 ratio [or 4,4'-methylen-diphenyl-diisocyanate].

* * * * *